United States Patent [19]

Goettsch

[11] Patent Number: 5,758,094
[45] Date of Patent: May 26, 1998

[54] COMPUTER VIDEO COMMUNICATIONS SYSTEM

[75] Inventor: Randy L. Goettsch, San Jose, Calif.

[73] Assignee: Winnov, Sunnyvale, Calif.

[21] Appl. No.: 449,367

[22] Filed: May 24, 1995

[51] Int. Cl.⁶ .................................................. G06K 15/00
[52] U.S. Cl. ........................ 395/200.34; 348/219; 348/17
[58] Field of Search ................................ 364/514 A, 516,
364/144, 146, 526; 348/234, 263, 265,
17, 219, 237, 270, 280, 391, 454, 488,
61, 220, 221, 15, 16, 353, 346, 354, 347,
348, 356; 358/310, 335, 906; 377/44, 54,
73, 107, 116; 395/200.34, 330; 370/259,
260, 262, 263; 379/202

[56] References Cited

U.S. PATENT DOCUMENTS

| | | | |
|---|---|---|---|
| 4,750,041 | 6/1988 | Vogel et al. | 348/220 |
| 4,806,776 | 2/1989 | Kley | 250/560 |
| 5,216,496 | 6/1993 | Miyamoto et al. | 348/237 |
| 5,226,063 | 7/1993 | Higashitsultsumi | 377/44 |
| 5,245,416 | 9/1993 | Glenn | 348/219 |
| 5,255,081 | 10/1993 | Miyamoto et al. | 348/234 |
| 5,382,974 | 1/1995 | Soeda et al. | 348/221 |
| 5,386,264 | 1/1995 | Sekine et al. | 348/202 |
| 5,392,223 | 2/1995 | Caci | 348/17 |
| 5,604,538 | 2/1997 | Kaneda et al. | 348/353 |

*Primary Examiner*—Dang Ton
*Attorney, Agent, or Firm*—Blakely, Sokoloff, Taylor, Zafman, LLP

[57] ABSTRACT

A computer imaging communications system includes a camera head having a CCD for the capture of video images according to a set of timing signals. The timing generator for the CCD is state-based such that state transitions in the CCD control logic can be controlled by a host computer or a camera adapter circuit. The set of timing signals provided to the CCD are generated in the camera head in response to a control/data signal generated by a controller which combines a clock with a coded control signal. The clocking signal has a variable frequency to allow video data to be generated at an arbitrary rate. First and second video signals defining a unique color space are output from the camera head and transmitted across a cable to the adapter card or host computer, where it is received for further processing.

39 Claims, 9 Drawing Sheets

| | 7 | 6 | 5 | 4 | 3 | 2 | 1 | 0 |
|---|---|---|---|---|---|---|---|---|
| LDLC | 0 | 0 | 1 | | | N | | |
| DJNC | 0 | 1 | 0 | | | OFF | | |
| JR | 0 | 1 | 1 | | | OFF | | |
| SKP | 0 | 0 | 0 | | | N | | |
| OSTW | 1 | ST | | | | N | | |
| OHV | 1 | H | V | 1 | 1 | 1 | 1 | X |

*FIG. 14*

COMPUTER VIDEO COMMUNICATIONS SYSTEM

FIELD OF THE INVENTION

The invention relates generally to the field of digital communication systems; primarily to the field of video camera apparatus and transmission of video signals in a computer-based communication network.

BACKGROUND OF THE INVENTION

In the field of digital communication systems there has been an ongoing effort at developing more efficient ways of transmitting audio and video information across computer networks. For example, computer workstations often need visual communication with other workstations for applications such as teleconferencing, where a picture or video of the operator greatly enhances productivity by providing person-to-person communication. Much of the development work to improve multimedia communication for computers has been concentrated on improving the architecture of communication processors. By way of example, U.S. Pat. No. 5,392,223 describes a communication processor system for coupling workstation units in a system which transmits audio and video information via a carrier.

Researchers and scientists have also devoted their attention to enhancing the resolution and signal characteristics of color television camera apparatus for use in multimedia systems. Typical color television cameras employ conventional solid-state imaging systems which typically include a single charge-coupled device (CCD) image sensor chip. The CCD has a discrete pixel structure which produces a color video signal that may be subsequently processed to obtain red (R), green (G) and blue (B) signals, in addition to luminance signals. Background information pertaining to CCD color video signals is found in U.S. Pat. No. 5,245,416 which discloses a CCD color camera and signal processing signal of a kind currently used in television cameras.

A typical color television camera generates color image signals according to any one of a number of predetermined television standards, such as NTSC, PAL or S_VHS standards. In both the NTSC and PAL standards, the luminance signal (Y) and the color difference signals (I and Q for the NTSC standard; U and V for the PAL standard) are produced by combining the primary color video signals R, G and B. A salient feature of cameras operating in accordance with these well-known standards is that video information is output from the CCD at a fixed data rate. By way of example, a NTSC camera is specified to have an output data rate of 30 frames per second. A camera operating in accordance with the PAL standard generates video images at a rate of 25 frames per second.

Another important characteristic of conventional color video cameras is that they produce video images in an encoded format; the analog output of the CCD being converted into a predetermined color space defined in accordance with the appropriate standard. Exemplary color television camera apparatus which produce color image signals according to predetermined standards, such as NTSC or PAL, can be found in U.S. Pat. No. 5,255,081 and U.S. Pat. No. 5,216,496. A timing generator for synchronizing the operation of a television camera by supplying composite vertical synchronizing (VSYNC) and horizontal synchronizing (HSYNC) signals to an image sensor for NTSC and PAL systems is disclosed in U.S. Pat. No. 5,226,063.

One of the shortcomings of prior art cameras is that the camera has been constrained by fixed timing relationships and data rates. Most often, a crystal resonator circuit is embedded in the camera hardware to provide a reference frequency such that video images are constantly being generated and transmitted across the video cable at a fixed frequency. By way of example, the PAL television camera standard outputs video information at a constant rate of 25 frames per second. One of the ramifications of this traditional camera architecture is that the processor receiving the video image must process the data at the speed it is being sent. In other words, the host computer must synchronize to the camera for each frame to be captured; if the computer's data processing unit is unable to handle this fixed video data stream—or if the system lacks memory sufficient to capture the video image for latter processing—system performance suffers. Alternately, the maximum image rate is fixed by the design of the camera.

To better appreciate the problem which exists in the art, consider a typical video conferencing application in which a NTSC camera is employed for video capture. A typical camera operating in accordance with the NTSC standard outputs 30 images (frames) per second, with each image (frame) being formed by two (ODD/EVEN) interlaced fields. The timing circuitry in a conventional camera specifies for the CCD, at the beginning of a field, whether the field is an ODD or an EVEN field. Thereafter, the CCD is instructed to alternately send ODD and EVEN fields. In a video conferencing application, however, there often arises a need for the resolution of an image to be a field size (or a subset of a field size) as opposed to a frame size. Unfortunately, due to the fixed timing inherent in conventional NTSC cameras every other field corresponds to the same view shifted down by half a scan line; it therefore becomes a very difficult task to transmit at a rate of, say, 60 images per second (e.g., a movie). In such a case, it would be desirable to instruct the CCD to constantly output the same field (e.g., the EVEN field) resulting in a 60 images per second camera.

BRIEF DESCRIPTION OF THE DRAWINGS

The present invention will be understood more fully from the detailed description which follows and from the accompanying drawings, which, however, should not be taken to limit the invention to the specific embodiments shown, but rather are for explanation and understanding only.

SUMMARY OF THE INVENTION

The present invention is a computer video communication system that enables video data to be transferred to a host computer at an arbitrary data rate (e.g., on a line-by-line basis). The inventive system allows a host computer control over the timing characteristics of the frame capture process in a completely deterministic manner. Instead of employing a camera that outputs video data according to fixed data rates/intervals, the camera architecture is such that its timing relationships can be controlled by a host computer. This means that the host can accept video data without requiring frame buffering or compression. Throttling of the data rate is accomplished by controlling the readout of CCD video data.

The present invention achieves these novel results by defining an entirely new camera interface and architecture that is independent of CCD resolution. According to the invention, a host computer can determine and control when a video frame is output and processed. Thus, the invention radically changes the conventional view of the camera as simply an analog signal generator. Practitioners familiar with video cameras and processing of video data will appreciate that the present invention offers a tremendously flexible camera architecture that is ideally-suited for interfacing with a host computer.

In one embodiment, the invention comprises a camera head having a CCD for the capture of video images in accordance with a set of timing signals. The timing generator for the CCD is state-based such that state transitions in the CCD control logic are controlled directly or indirectly by either the host computer, camera adapter circuitry, or the camera head itself. The set of timing signals provided to the CCD are generated in the camera head in response to a control/data signal. First and second differential video signals defining a unique color space are then output from the camera head. These differential video signals are derived from the raw analog video signal produced by the CCD.

A communications media coupled to the camera head transmits the first and second differential video signals either to the camera adapter circuitry or directly to a host computer. The communications media normally comprises a cable which transmits control/data signals to the camera head to establish the timing patterns and operating frequency for the CCD. The control/data signal is generated by a controller unit in the camera adapter which combines a clock signal with a coded control signal for transmission across the communications media. The clocking signal has a variable frequency to allow the first and second differential video signals to be generated at an arbitrary rate. By generating timing and control signals remotely, the logic required at the camera head for signal processing is greatly simplified.

According to the color space defined for one embodiment of the invention, the first differential video signal represents the luminance (Luma or Y) signal and the second differential video signal is the chrominance (Chroma or CH) signal of the video image.

DETAILED DESCRIPTION

A computer imaging communications system is described which includes a flexible CCD controller architecture for computer-based camera applications. The invented architecture allows control and intelligence to be distributed among the host computer, computer adapter interface, and a camera head. In the case of geographically distributed cameras, control can be further shared between a remote host computer and a local controller computer. In the following description, numerous specific details are set forth such as particular circuit configurations, devices, interconnections, etc., in order to provide a thorough understanding of the present invention. It should be understood, however, that these specific details are not necessarily required to practice the present invention. In other instances, well known structures, circuits, methods, etc., have not been shown or discussed in detail in order to avoid obscuring the invention.

Figure 1A:
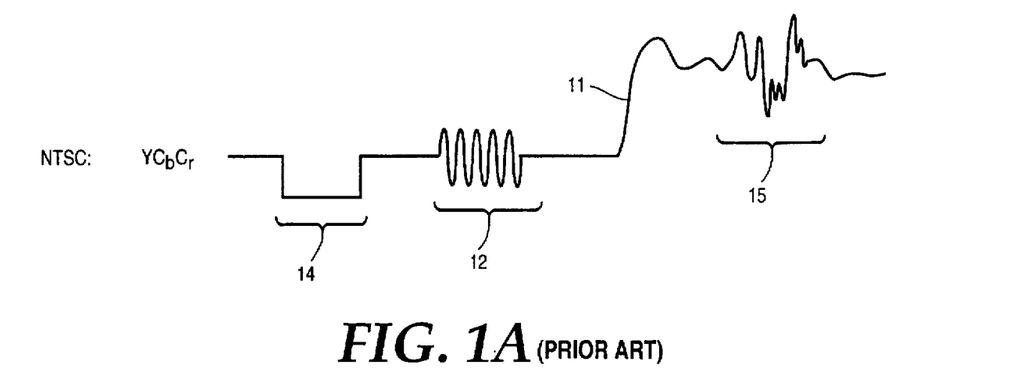
FIG. 1A illustrates a standard NTSC composite video image signal.
Figure 1B:
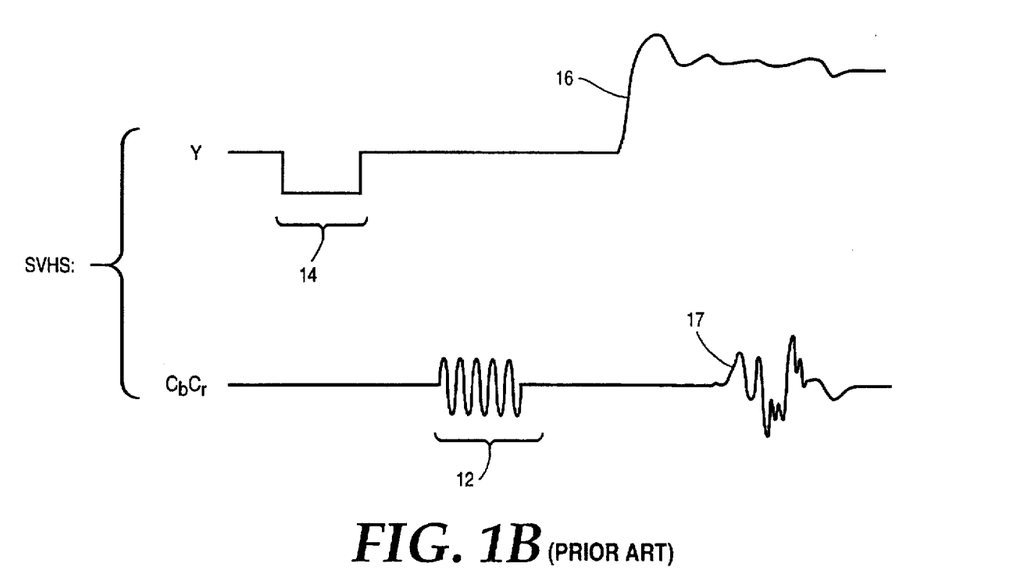
FIG. 1B illustrates standard component S_VHS component video image signals.

Conventional video cameras output a standard signal format based on three components: Luma (Y), Blue versus Luma difference ($C_B$), and Red versus Luma difference ($C_R$). By way of example, standard video signals for NTSC and S_VHS standards are illustrated in FIGS. 1A and 1B, respectively. FIG. 1A shows a composite NTSC video signal 11 ($YC_BC_R$) which includes a horizontal sync (HSYNC) digital pulse 14, a clocking frequency component 12, and the actual composite video signal (11 and 15). The composite video signal includes Chroma color information (signal portion 15) modulated onto the Luma component (signal portion 11). The clock reference frequency component 12 is commonly supplied by a phase lock-looped (PLL) circuit to provide self-clocking in accordance with the NTSC standard.

FIG. 1B illustrates the S_VHS interface standard specified for baseband analog signals. As can be seen, the Luma and Chroma waveforms are represented as component signals, 16 and 17, respectively. Note that the Chroma signal 17 (i.e., $C_R$ and $C_B$) is based about zero since it represents a color difference. The fixed frequency clock signal 12 is superimposed with the Chroma signal 17, while the HSYNC pulse 14 is included with the Luma information. According to the S_VHS standard, clock signal frequency 12 is fixed at 3.5816 MHz.

Charge-coupled devices (CCDs) have widely replaced tube-based technology for imaging applications such as video cameras. As such, the native signal output from the CCD normally requires processing steps to convert to the $YC_BC_R$ formats shown in FIGS. 1A and 1B. In the past these processing steps have been performed by an encoding device incorporated into the video camera apparatus. Computer-based video imaging or processing systems have been required to comply with the $YC_BC_R$ video signal standards for receiving video data before performing additional processing steps such as compression and filtering.

Figure 2:
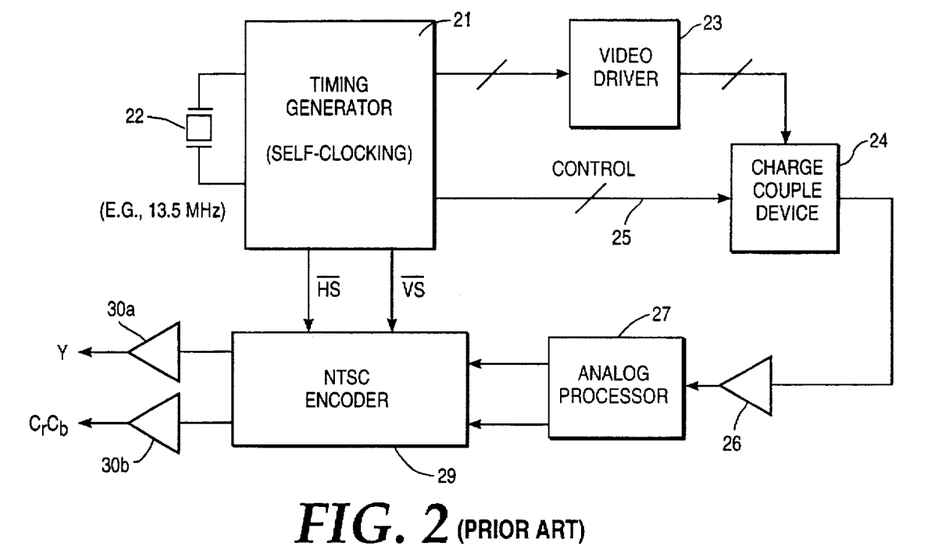
FIG. 2 is a circuit schematic block diagram of a conventional camera head.

With reference now to FIG. 2, there is shown a circuit block diagram of a traditional television camera head that includes a CCD 24 driven by clocking and timing signals produced by a video driver circuit 23 and timing generator circuit 21. Timing generator 21 produces the vertical and horizontal timing signals that control CCD 24 as shown by lines 25. A crystal oscillator 22 provides a constant reference frequency (e.g., 13.5 MHz for NTSC) for self-clocking of the timing generator circuitry. This fixed reference frequency is utilized by generator 21 to determine the number of Chroma pixels output by CCD 24.

By way of example, according with the NTSC standard the clocking provided along lines 25 produces a standard output data rate of 30 frames per second from CCD 24. Power amplifier 26 and analog processor circuitry 27 convert the analog output of the CCD 24 into Luma and Chroma signal components. The native signal output from the CCD is then converted to the standard format (e.g., NTSC) by encoder block 29. Timing generator 21 provides horizontal sync and vertical sync (i.e., HS# and VS#) signals to encoder 29. Single-ended video drivers 30a and 30b produce the Luma and Chroma signal components that may then be combined or transmitted along the communications media to a receiver.

As discussed previously, a primary drawback of the camera architecture illustrated in FIG. 2 is that the timing frequency provided to CCD 24—and hence the video output data rate—is a constant. This means that the receiver compressing the data must synchronize to the camera head every time that it captures a frame. Images in such a system are perpetually being sent to the processor at the constant data rate. Additionally, every camera head within the system must include some type of encoder circuitry 29 to produce the video image signal in a format compatible with any one of a number of established television camera standards. Encoding circuitry 29 is usually costly and must be duplicated for every camera head within the system.

Figure 3:
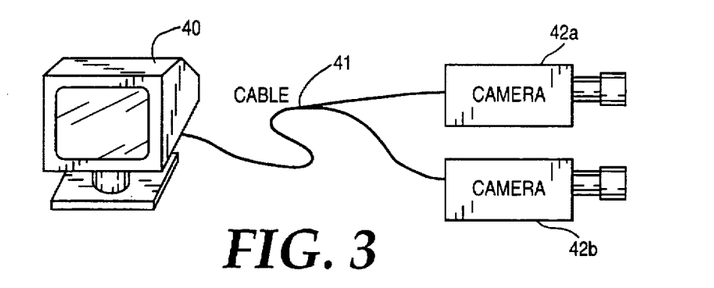
FIG. 3 shows a general view of the computer video communication system of the present invention.

FIG. 3 is a simplified diagram that illustrates the basic concept of the computer video communication system of the present invention. Rather than providing a camera head which is limited to outputting a fixed number of frames per second for a visual field, the invention provides a more flexible and efficient interface between video cameras 42 (42a, 42b, etc.) and a host computer 40. The system of FIG. 4 uses native CCD signals to produce video images at any desired arbitrary rate by controlling the timing generation either at the host computer, or with a specialized camera adapter circuit coupled to the host computer. One benefit of this approach is that it reduces the number of signal wires required for transmission of video data from camera heads 42 to host computer 40 (or, for instance, to a camera adapter card connected to a slot of host computer 40). Thus, the novel camera interface of the present invention permits multiple cameras to be multiplexed on a single cable 41; additional connectors are simply used to connect additional cameras.

Figure 4:
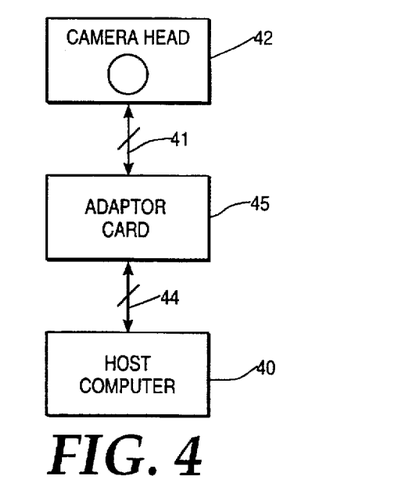
FIG. 4 is a simplified block diagram of one embodiment of the video communication architecture of the present invention.

FIG. 4 is a generalized conceptual diagram of one embodiment of a computer video communications system which includes a camera head 42 interfaced with a camera adapter circuit 45 via interface 43. Interface 43 specifies the signal definitions for a unique color space in addition to instruction and status definition signals according to the present invention. Note that the Luma and Chroma signals for the color space are provided to adapter 45 as differential signals, and are not multiplexed or modulated with carrier signals. As explained above, adapter 45 may comprise a remote circuit, a card coupled to a port of computer 40, or a circuit embedded within the host.

Host computer 40 communicates with adapter 45 via interface 44. Basically, host computer 40 sets up the adapter circuitry with initializing signals, after which time camera adapter 45 specifies the timing signal and data rate information to camera head 42. Video information received by camera adapter 45 from camera head 42 is transferred to host computer 40 via interface 44, which might typically operate at a bit rate of approximately 10 MHz. After receiving the video data from the adapter circuitry, the host computer is free to operate (e.g., compression, filtering, dithering, etc.) on the frame data received.

It should be understood that in alternative embodiments, host computer 40 may comprise an embedded local host processor that communicates with a remote host computer. In such a system, the camera adapter circuitry may also be embedded within the local host, or comprise a card which connects to a port of the local host processor. In still other embodiments, the camera adapter circuitry may be located in close proximity to a remote camera or CCD display. Thus, practitioners in the art will recognize that a great variety of system configurations may be realized without deviating from concepts taught by the present invention.

Figure 5:
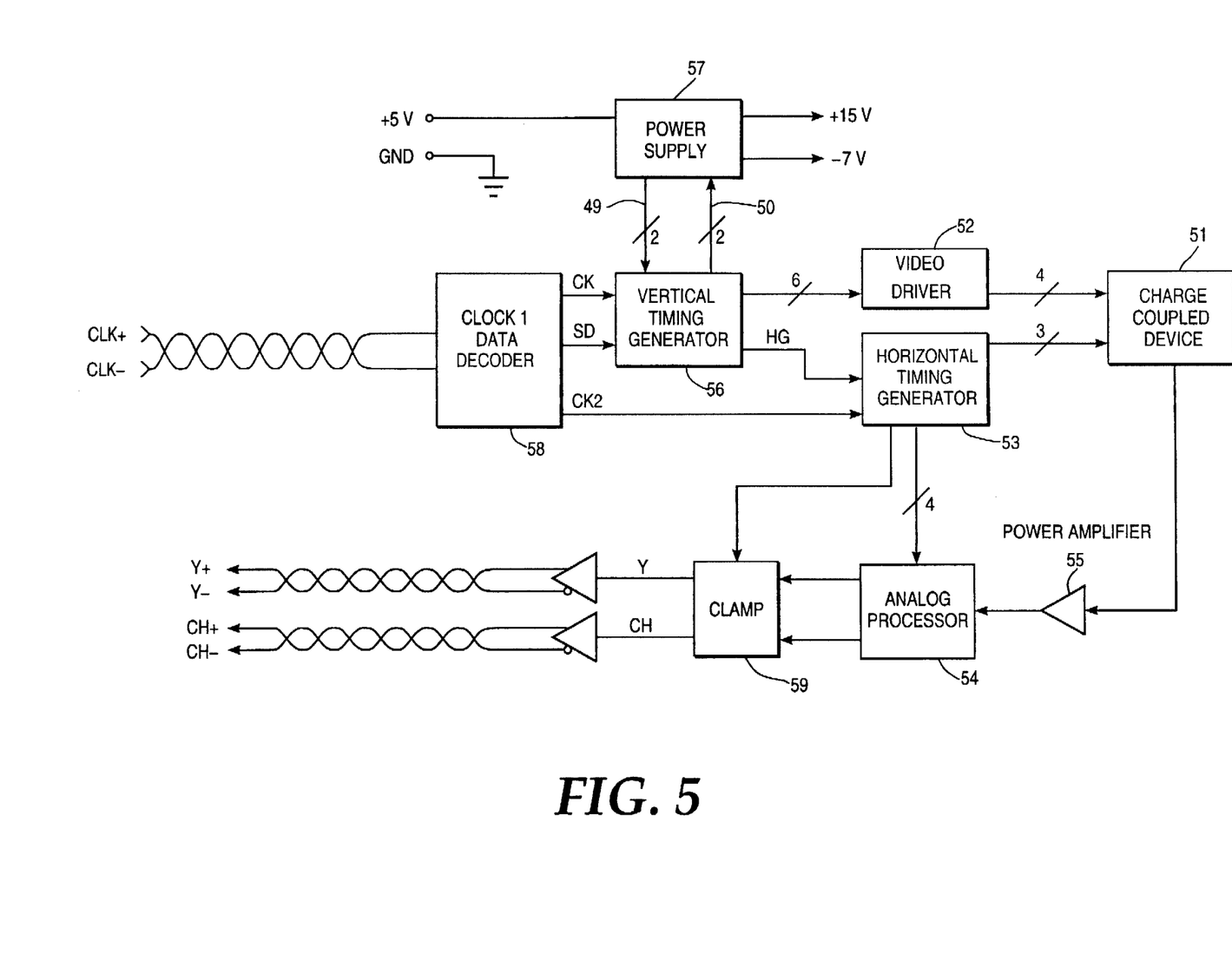
FIG. 5 is a circuit schematic block diagram of one embodiment of the camera head of the present invention.

Referring now to FIG. 5, there is shown a circuit schematic block diagram of the camera head utilized in the computer video communication system of the present invention. A portion of the camera head interface 43 shown in FIG. 5 is represented as the differential clock signal (labeled CLK+ and CLK−) coupled to clock/data decoder (CDD) circuit 58. This differential signal comprises video timing control information combined with a data rate clock generated by the camera adapter. The adapter logic circuitry sends out serial data which includes control and clocking information to the camera head to specify the particular timing patterns and frequencies for the CCD elements. In other words, the clock and control information specifies the bit rate of the CCD as well as the particular edge changes for the vertical and horizontal timings. In contrast to prior art designs, which relied upon free-running clocks embedded within the camera head itself, the control/data information is programmable and is specified by either the camera adapter circuit or the host computer.

Figure 8:
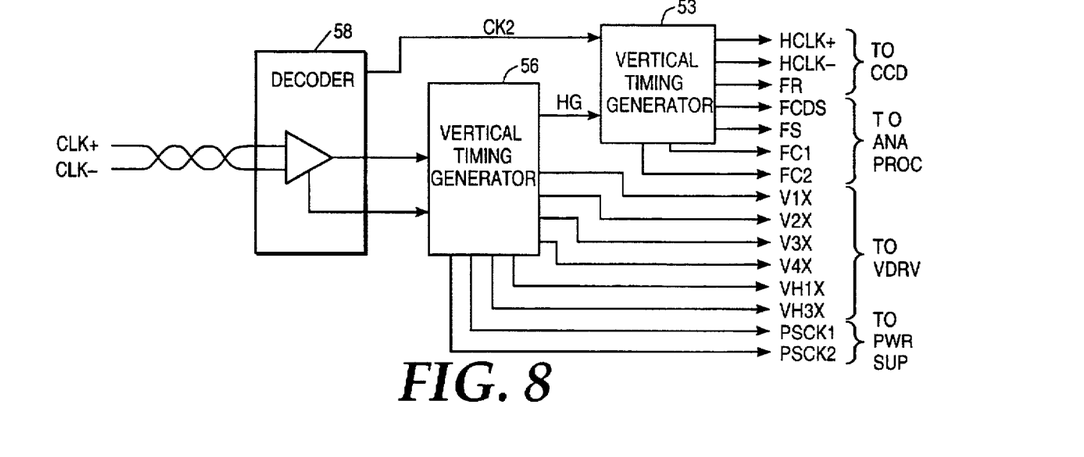
FIG. 8 depicts details of the signals output by the vertical and horizontal timing generator circuitry shown in FIG. 6.

CDD 58 separates the control channel information from the clock signal and produces three outputs: The standard clock ("CK") specified by the controller, the serial data ("SD") control information, and a clock signal having a doubled frequency ("CK2") with respect to the CK clock signal. Clock signal and serial data control information is provided to vertical timing generator (VTG) 56 to specify the specific timing relationships to implement in the camera head. VTG 56 comprises ordinary digital logic implementing a state machine, more details of which will be described shortly. The control information specifies the event information in a 3-bit (one start bit plus a 2-bit code) serial format. VTG 56 takes this information and outputs timing pattern signals to video driver unit (VDRV) 52, which comprises a standard commercially-available part. VTG 56 also provides horizontal signal information to horizontal timing generator (HTG) 53. HTG 53 also receives the doubled clock signal CK2 from CDD 58. In one embodiment, VTG 56 and HTG 53 are implemented in an ordinary field programmable logic device. Detailed signal outputs from vertical timing generator 56 and horizontal timing generator 53 are shown in FIG. 8.

The HTG 53 and VDRV 52 units output a set of standard signals to control charged-coupled device (CCD) 51. By way of example, CCD 51 may comprise a Sony Part No. ICX0558K, or Sharp Part No. LX2323H. The output of CCD 51 is a video analog signal that is amplified by power amplifier 55 and then input to analog processor 54. Analog processor 54 receives horizontal timing information from HTG 53 and converts the time-multiplexed analog input signal into Luma (Y) and Chroma (CH) color signals.

Figure 7:
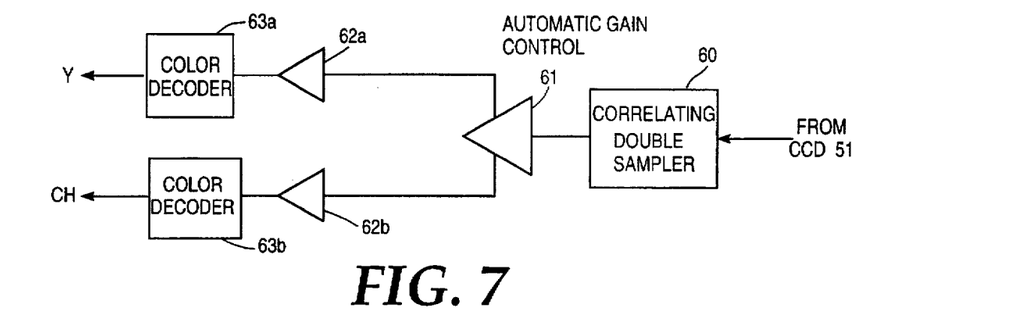
FIG. 7 shows details of the analog processor circuitry utilized in one embodiment of the camera head of FIG. 6.

FIG. 7 shows a more detailed block diagram of analog processor 54 including a correlating double sampler (CDS)

60 followed by an automatic gain control (AGC) amplifier 61. Amplifier 62a and 62b drive the output signal from AGC 61 to a pair of color decoders 63a and 63b. The output of the color decoder 63a represents the Luma (Y) signal whereas the output of clock decoder 63b represents the Chroma (CH) color information. In one embodiment, analog processor 54 comprises Sharp Part No. IR3P97.

With reference once again to FIG. 5, color information from analog processor 54 is supplied to clamping circuitry 59, which is also driven by a horizontal blanking (HBLANK) signal provided by HTG 53. Clamping circuitry 59 comprises a standard clamping field-effect transistor (FET) and a capacitor which fixes the DC level of the color signals. The Luma and Chroma information is then amplified differentially and output across the communications media (e.g., a cable) to the adapter or host computer. This is shown in FIG. 5 by the respective differential Luma and Chroma signals Y+, Y− and CH+, CH−.

FIG. 5 also shows a 2-bit control signal 50 being provided to a specially designed two-stage power supply 57. Power supply 57 includes a charge pump circuit for generating high voltage power signals (i.e., +8 V, −4 V; +15 V, −7 V) from a standard 5 volt power supply. Power supply 57 also produces a 2-bit voltage monitoring signal 49 coupled to VTG 56 that indicates the current supply potential being output by supply 57.

Figure 13A:
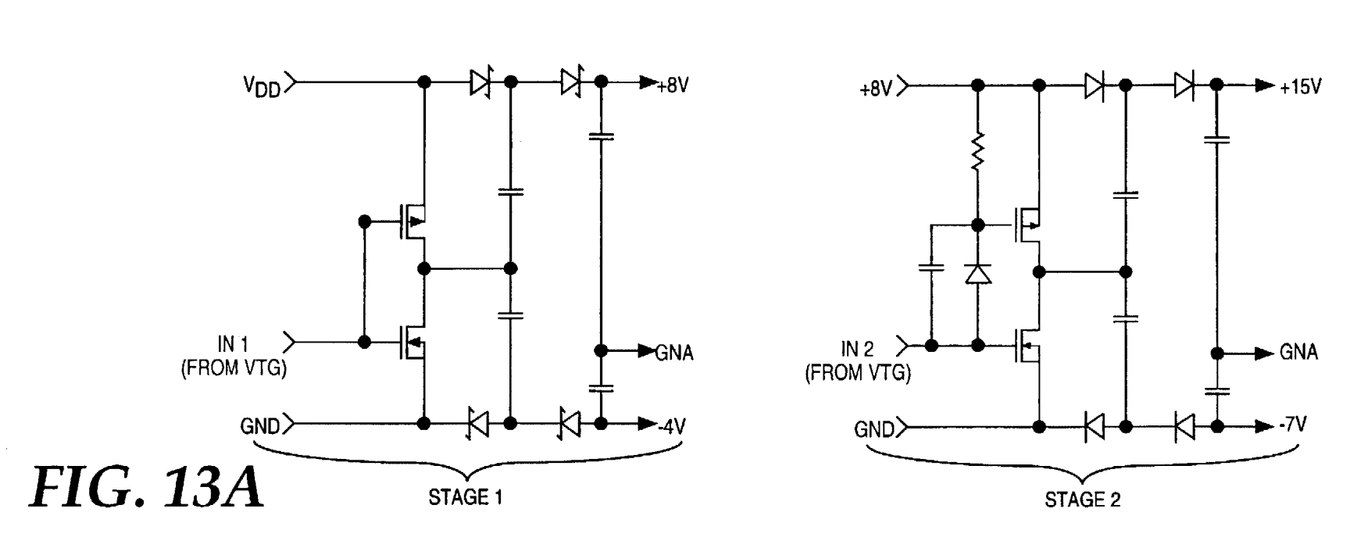
FIGS. 13A and 13B are a circuit schematic of the power supply circuit utilized in the embodiment of FIG. 5.
Figure 13B:
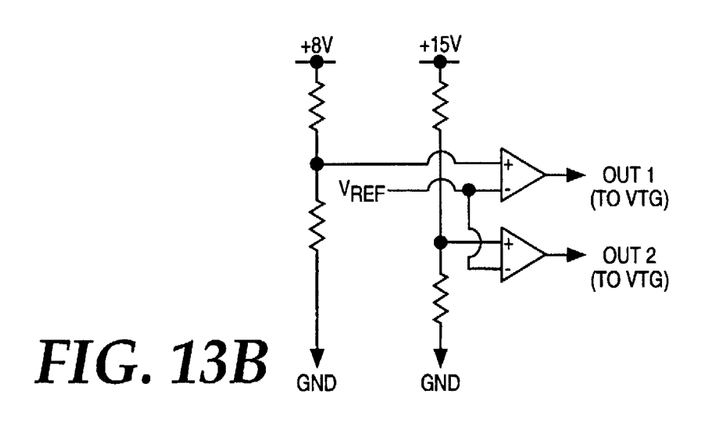

One bit of signal 50 is used to control each stage of two-stage power supply 57. In one stage, supply 57 outputs a voltage level of +8 volts and −4 volts, wherein the second stage outputs +15 volts and −7 volts. During ordinary operation power supply 57 outputs the higher voltage supply levels (i.e., +15 V, −7 V) required by CCD 51. During the horizontal and vertical blanking periods both the low and high power supply levels are switched synchronous to the video. For example, the high power supply voltage may synchronously switch from +15 V to +8 V at the same time that the lower power supply voltage switches from −7 V to −4 V. Switching the power supply levels in this manner synchronous to the video is advantageous for reducing noise in the video output. Detailed circuit schematic diagrams of power supply circuit 57 are shown in FIGS. 13A and 13B. Operation of the circuits shown in FIGS. 13A and 13B will be fully understood by ordinary practitioners in the field of analog/digital circuitry.

Figure 9:
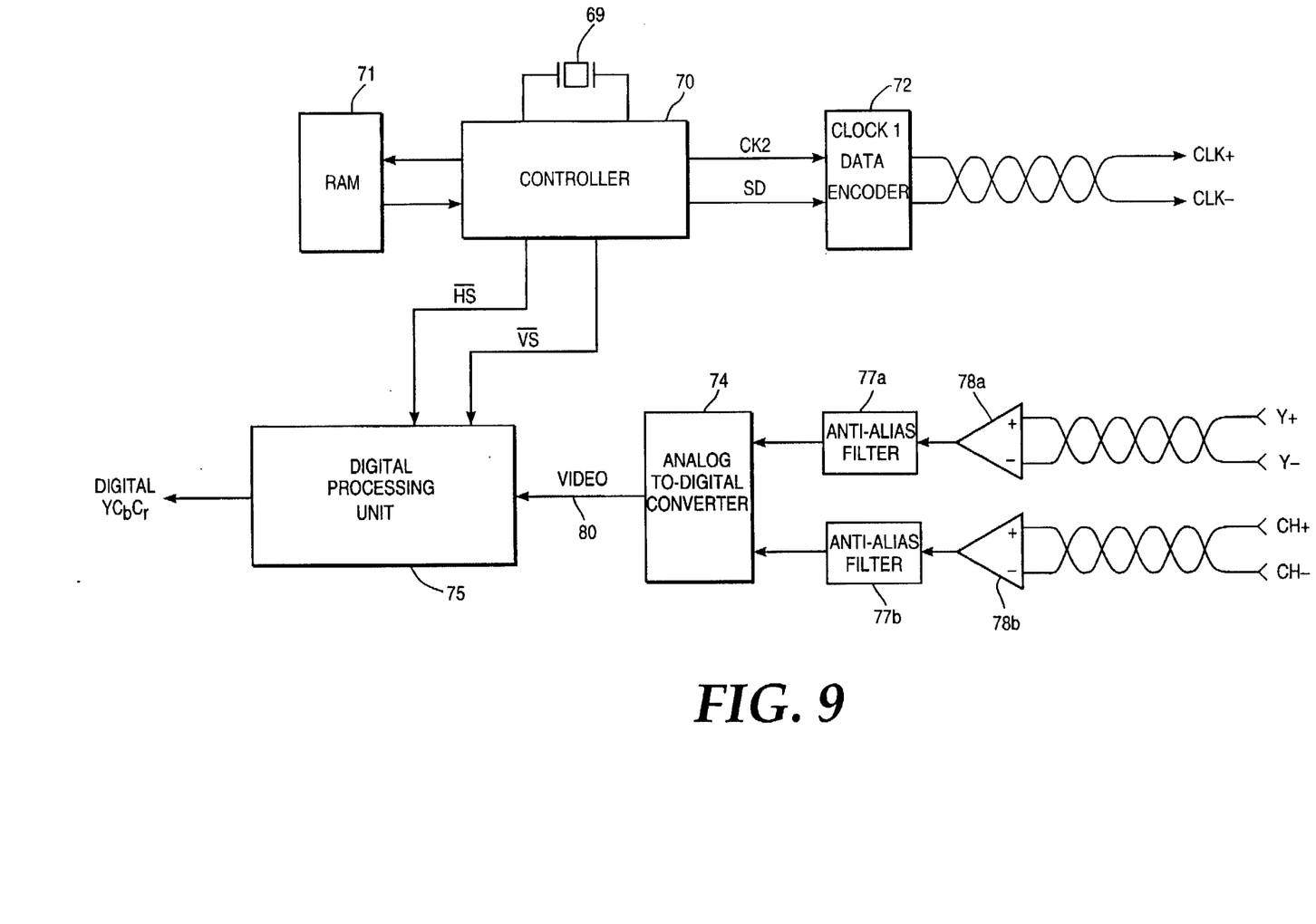
FIG. 9 is a circuit schematic block diagram of the camera adapter circuit utilized in one embodiment of the present invention.

FIG. 9 is a circuit schematic block diagram of the camera adapter circuitry utilized in the present invention. The camera adapter comprises a controller device 70 which, in one embodiment, comprises a microcoded engine providing control logic functions for commanding the camera head to specify certain vertical and horizontal timing patterns for the CCD. Controller 70 has inputs coupled to a resonator 69. Resonator 69 includes an ordinary crystal oscillator for generating an input signal having a reference frequency to controller 70. Controller 70 utilizes this reference frequency to produce the clock signals CK and CK2.

Controller 70 also produces the 3-bit serial data output that comprises the edge timing control information. This information is combined with the clock signal by clock/data encoder (CDE) 72. CDE 72 is coupled to the camera head via the transmission media (e.g., twisted pair, coaxial or fiber optic cable). Note that the differential signal notation CLK+ and CLK− shown in FIG. 9 includes a control information channel. Thus, controller 70 and CDE 72 cooperate to provide both frequency and timing pattern information to CCD 51 of the camera head.

Figure 11:
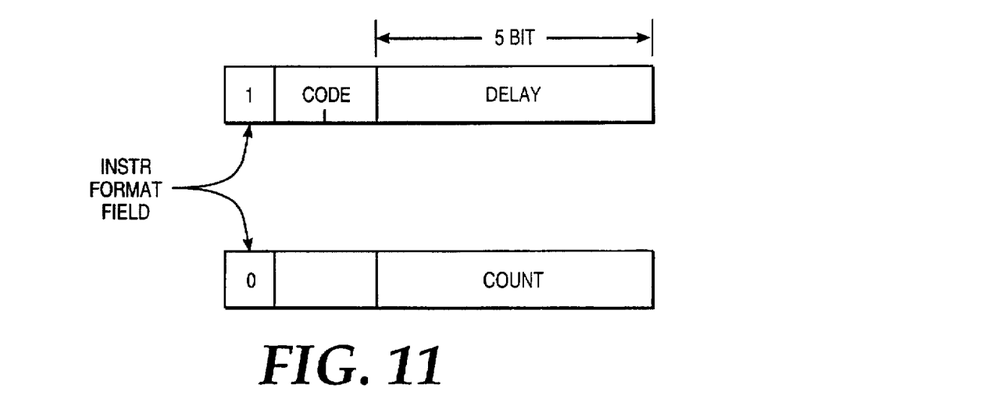
FIG. 11 shows instruction format types associated with the controller of FIG. 10.
Figure 14:
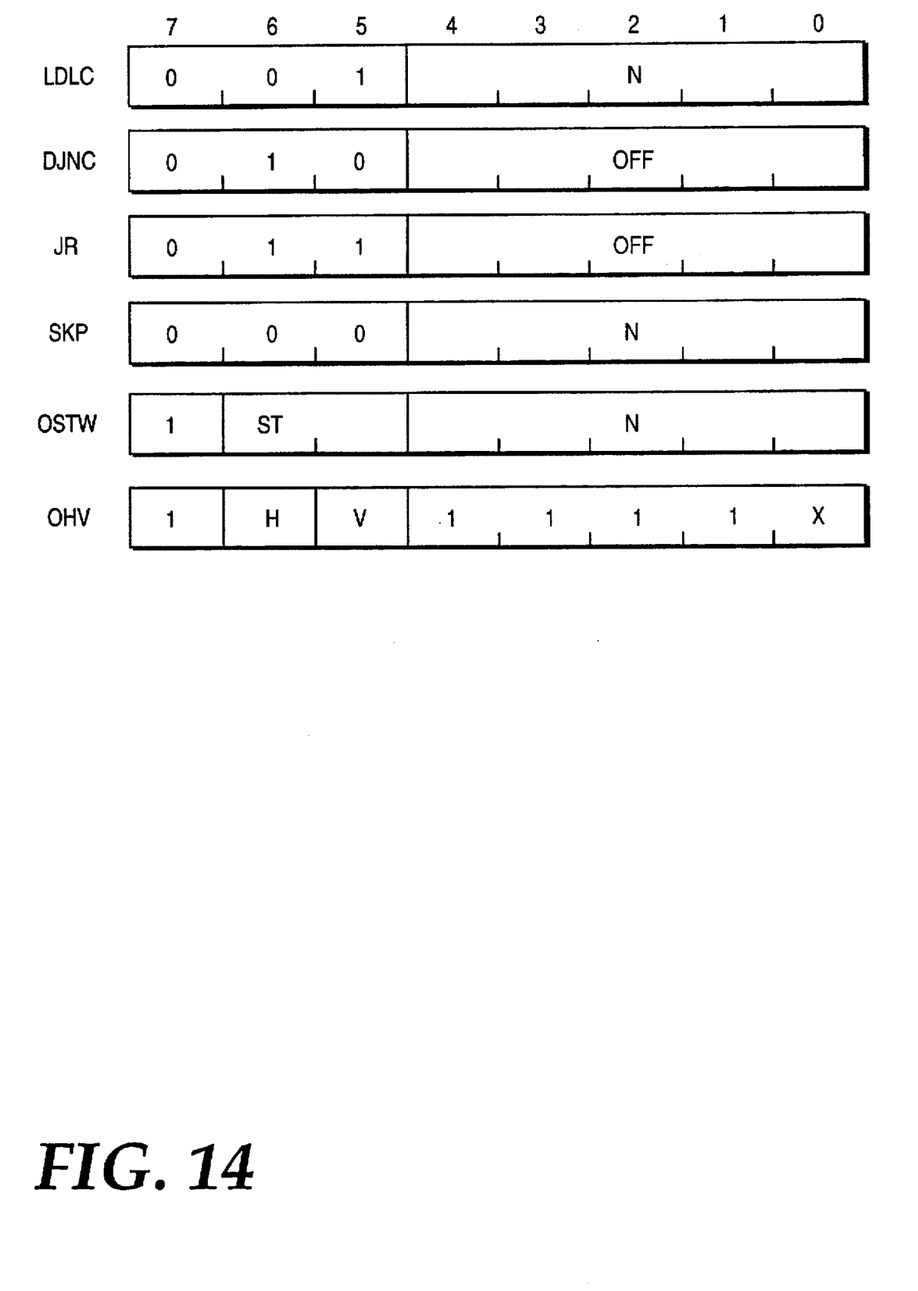
FIG. 14 illustrates instruction encodings for one embodiment of the present invention.

In the embodiment of FIG. 9, controller 70 is a simple six instruction processor that fetches instructions stored in random-access memory (RAM) 71. The instruction encodings fall within two basic formats as shown in FIG. 11, with one format indicating delay information and the other format comprising a jump/decrement type of instruction. The first bit of the instruction format field specifies the instruction type. As discussed previously, VTG 56 is a state-based timing generator that has a 256-byte instruction address space. The instructions are further described in Table 1, shown below. Instruction encodings are illustrated in FIG. 14 for one embodiment of the present invention.

The camera adapter shown in FIG. 9 is coupled to the transmission cable interface to receive the two differential color signals containing the Luma (Y) and Chroma (CH) color information. Although the embodiment of FIG. 9 shows differential Luma and Chroma signals being received by the adapter circuitry, it should be understood that other embodiments could transmit video data from the CCD according to a completely different color space definition, e.g., RGB.

The Y and CH differential color signals are coupled to the inputs of a pair of differential receivers 78a and 78b, respectively. Receivers 78a and 78b, in turn, produce single-ended video output signals coupled to anti-alias filters (AAF) 77a and 77b, respectively.

Figure 6:
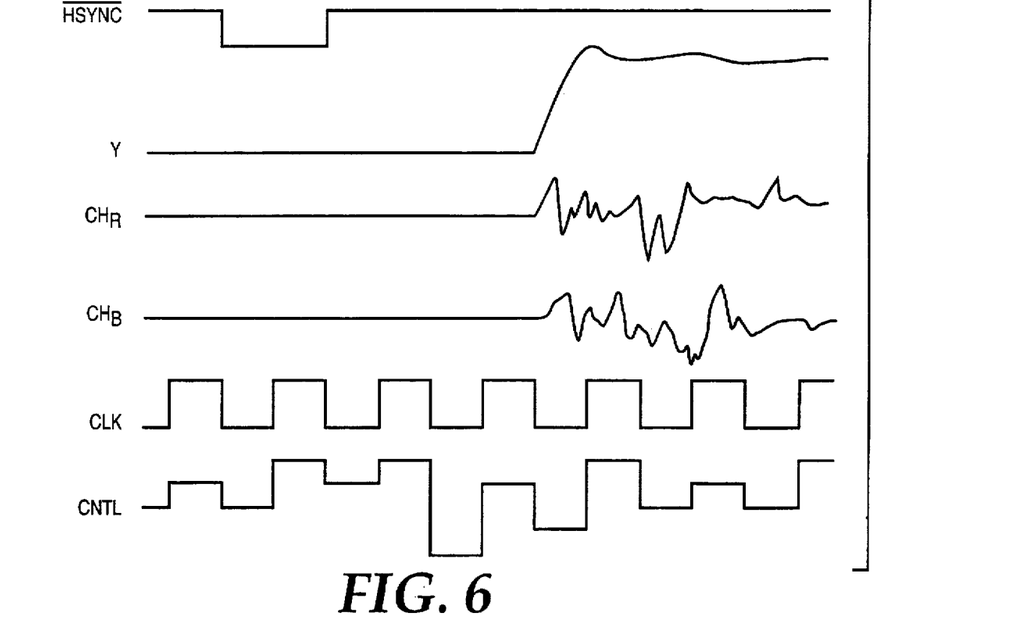
FIG. 6 is a set of timing waveform diagrams which illustrates transmission of various video signals in accordance with the present invention.

Instead of transmitting the Luma and Chroma video signals on separate twisted pair wires, another possibility is to utilize a single twisted pair of wires (or cable) and multiplex the video information across the transmission media. In other words, the interface between the camera adapter circuitry and the camera head could simply consist of a single two-conductor cable, wherein the Luma and Chroma information is transmitted back to the adapter circuitry or host computer in a time-multiplexed manner. In such an embodiment, AGC 61 would provide a single-ended output, rather than the dual output shown in FIG. 6. Of course, standard de-multiplexing circuitry would need to be included in the receiver to extract the differential Luma and Chroma information.

Referring once again to FIG. 9, both of the anti-aliasing filters generate an analog output that is input to an analog-to-digital converter (ADC) 74. The output of ADC 74 is a digital video signal 80 defined in accordance with the color space of one embodiment of the present invention. By way of example, the video information contained in signal 80 is shown in the timing waveform diagrams of FIG. 6. This digital video signal may be coupled to a digital processor 75 to perform a variety of well-known data processing operations. To enable certain data processing functions, controller 70 also provides horizontal blanking (HB#) and vertical sync (VS#) signals to digital processor 75. Processor 75 produces a digital output in accordance with standard video data processing techniques.

It should be understood that the digital processing unit 75 need not be included as part of the camera adapter circuitry of FIG. 9. That is, digital processing can be performed remotely using a dedicated processor, or even within the host computer. In the embodiment of FIG. 9, controller 70 and processor 75 are intended to be fabricated on a single semiconductor substrate as an application specific integrated circuit.

Figure 10:
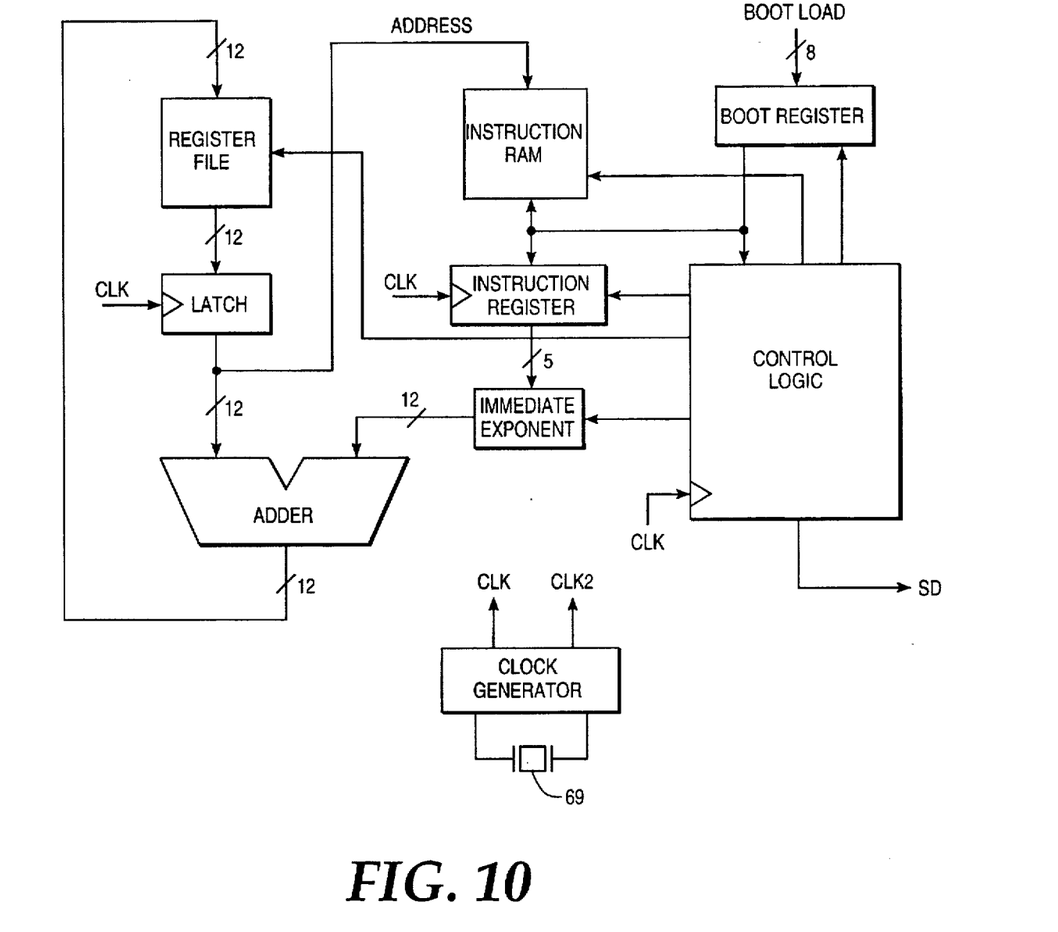
FIG. 10 is a detailed block diagram of the controller shown in FIG. 9.

FIG. 10 shows details of one embodiment of controller 70. Controller 70 comprises a control logic block 82 that includes standard state machine logic and microcode containing information of time and edge transitions for the vertical and horizontal signals that are to be provided to CCD 51. Control logic block 82 receives the clock signal CK provided by clock generator circuitry 90 coupled to resonator 69. Control logic unit 82 is also shown coupled to boot register 81 which is utilized to initialize control logic block 82 and instruction register 85 as during a boot load.

In normal operation, instructions are fetched from instruction RAM 83 and placed into instruction register 85. The 5-bit immediate field of the instruction is then expanded into a 12-bit number in a non-linear fashion by expansion block 86. The six instructions executed by the controller embodied in FIG. 10 are listed in Table 1 below.

TABLE 1

| Mnem | Description | Exec Time |
| --- | --- | --- |
| LDLC | Load loop counter | 2 |
| DJNC | Decrement and jump relative on no carry | 2 |
| JR | Jump relative | 1 |
| SKP | Skip N clocks | 3 + N |
| OSTW | Output state transition and wait N clocks | 4 + N |
| OHV | Output horizontal and vertical sync's | 4 |

The instruction encodings for the embodiment of FIG. 10 are shown in FIG. 14. Note that the N and OFF fields shown in FIG. 14 have encodings as shown below in Table 2. These encodings show how the 5-bit value output by instruction register 85 is scaled to a 12-bit value output by block 86.

TABLE 2

| N, OFF | Value |
| --- | --- |
| 11111 | 0 |
| 11110 | 1 |
| 11101 | 2 |
| : | : |
| 01001 | 22 |
| 01000 | 23 |
| 00111 | 24 |
| 00110 | 57 |
| 00101 | 90 |
| 00100 | 123 |
| 00011 | 156 |
| 00010 | 189 |
| 00001 | 222 |
| 00000 | 255 |

The state transition field for the instruction and encodings are listed below in Table 3.

TABLE 3

| ST | Transition | |
| --- | --- | --- |
| 00 | NXT | Next State |
| 01 | JH | Jump Horizontal |
| 10 | JV | Jump Vertical |
| 11 | JF | Jump Frame Field |

The expanded instructions are inserted into an adder loop comprising adder 91, register file 92, and latch 93. This loop implements the time delays between edge events in the horizontal and vertical timing patterns specified for the video imaging device. The 5-bit delay output by instruction register 85 is decremented by one in each clock cycle to provide a variable amount of timing per instruction. For instance, if the 5-bit field specified in register 85 corresponds to value 255, the loop cycles for 256 clocks before fetching the next instruction; it then outputs the code associated with that instruction. The code is output by control logic unit 82 as shown by the serial data (SD) output. As discussed previously, the SD signal comprises a 3-bit (=one start bit+2-bit code) signal multiplexed with a clock signal; it is transmitted as a one-bit serial data output. In the embodiment of FIG. 10, control logic unit 82, instruction register 85 and immediate exponent block 86 are implemented as an ordinary field programmable logic device.

Figure 12:
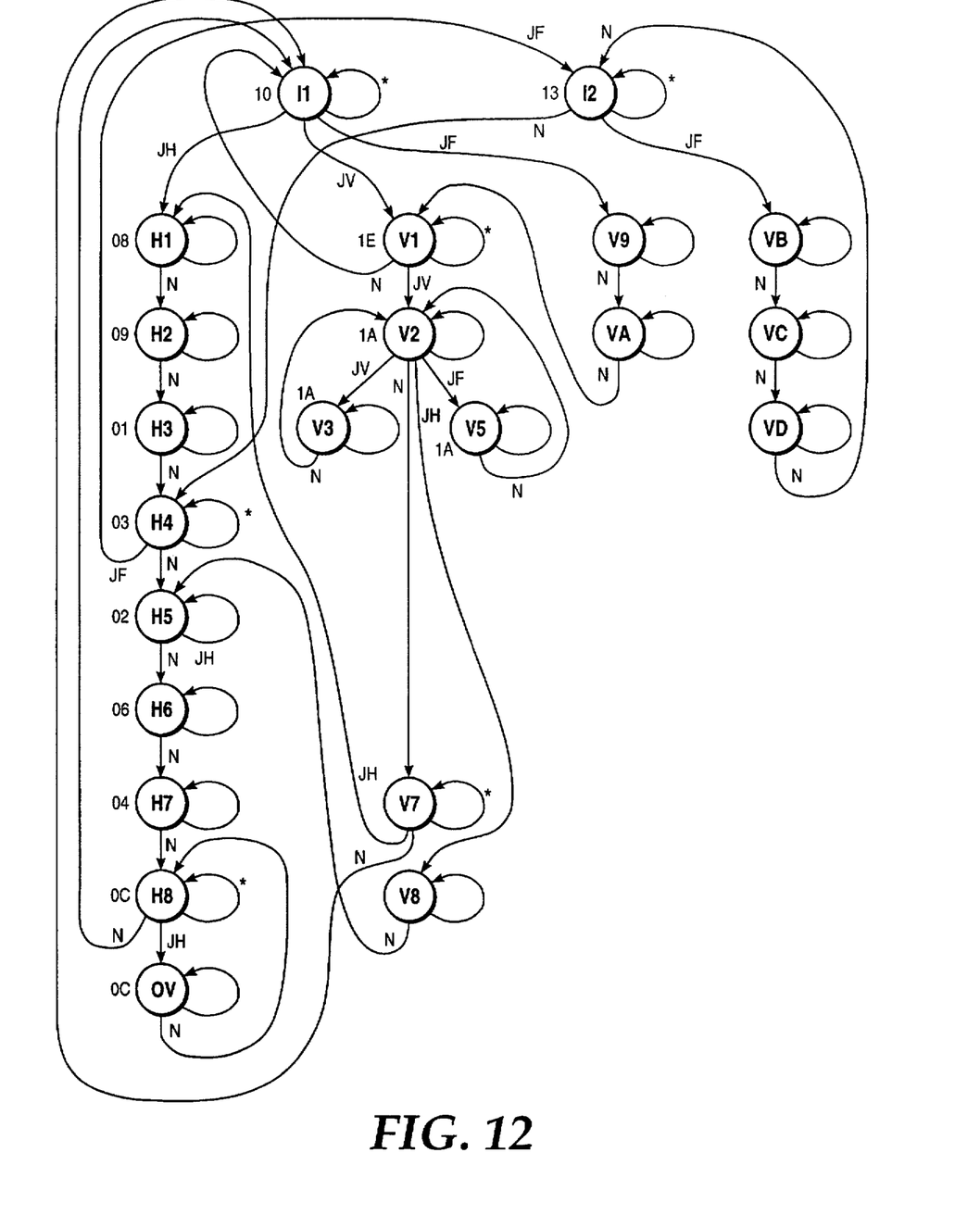
FIG. 12 is a state diagram showing specific state transition sequences for controlling the CCD elements in accordance with one embodiment of the present invention.

Specific state transition sequences that are followed to properly sequence the CCD elements are shown in the exemplary state diagram of FIG. 12. (Note that in the state diagram of FIG. 12, the "*" indicates "NOT anything else".)

In FIG. 12, the idle state I1 represents the normal active video period (i.e., the horizontal period) wherein pixels are being shifted out of the CCD array on a continuously clocked basis. Following a JH instruction, the idle state transitions into a sequence representing the horizontal blanking period. This sequence is shown in FIG. 12 by states H1 through H8. The horizontal blanking period ends after state H8. Overflow conditions are handled in state OV.

The vertical blanking period transfers data from the photo-accumulators to the CCD array, and is represented in FIG. 12 by states V1 through V8. Note that states V7 and V8 are particular to the specific embodiment shown and are used to permit exiting in the vertical blank period from EVEN or ODD fields. Further, the second idle state, 12 is generally not used in most applications, but is included in the embodiment of FIG. 12 for situations wherein the shutter of the camera lens is intentionally left open for a time exceeding one frame. Certain inhibiting and clearing out states—represented in FIG. 12 by states VB, VC, and VD—are included to accommodate this feature.

Practitioners will appreciate the many advantages provided by the video communication system of the present invention over traditional video system designs. Assume, for example, a frame size of 640×480 (pixels) and a field size of 640×240. To make a movie having an image size that is 320×240 a standard NTSC camera is limited by its maximum output of 30 images per second. On the other hand, a system constructed in accordance with the present invention could provide 60 images per second while being clocked at the same speed as the standard NTSC camera.

Whereas many alterations and modifications to the present invention will no doubt become apparent to the person of ordinary skill in the art after having read the foregoing description, it is to be understood that the particular embodiments shown and described by way of illustration are in no way intended to be limiting. Therefore, reference to the details of the illustrated diagrams is not intended to limit the scope of the claims, which themselves recite only those features regarded as essential to the invention.

I claim:

1. A video imaging system for a computer comprising:
    a camera head having a charge-coupled device (CCD) for capture of video images in accordance with a set of timing signals determined by a control signal, the CCD outputting an analog video signal, the camera head including a timing generator means coupled to the CCD for generating the set of timing signals; the camera head further including means for producing first and second video signals derived from the analog video signal, the first and second video signals defining a color space;
    a communications media coupled to the camera head for transmission of the control signal and the first and second video signals;
    an adapter circuit coupled to the communication media comprising a controller means for generating the control signal and a converter means for converting the first and second video signals into a digital signal, wherein the control signal defines a variable frequency clocking signal coupled to the CCD to allow transfer of the first and second video signals at an arbitrary rate.

2. The system of claim 1 wherein the first and second video signals comprise differential video signals.

3. The system of claim 2 wherein the timing generator means comprises a state machine and the control signal comprises the clock signal combined with a code signal, the code signal causing state transitions in the state machine with a particular state defining the set of timing signals for the CCD.

4. The system of claim 3 wherein the first differential video signal is a Luma signal and the second differential video signal is a Chroma signal.

5. The system of claim 4 wherein the Chroma signal comprises time-multiplexed Chroma Red ($CH_R$) and Chroma Blue ($CH_B$) signals.

6. The system of claim 4 wherein the communication media comprises a cable.

7. The system of claim 6, further comprising means for transmitting the Luma and Chroma signals across the cable in a time-multiplexed manner.

8. The system of claim 6 wherein the cable is a coaxial cable.

9. The system of claim 6 wherein the cable comprises a twisted pair.

10. The system of claim 6 wherein the cable comprises a fiber optic cable.

11. The system of claim 1 wherein the adapter circuit is housed on a printed circuit board having connections compatible with an input port of the computer.

12. A computer video communications system comprising:
 a communication media for transmission of information;
 a camera having a charge-coupled device (CCD) for capturing a video image and producing an uncoded video signal in accordance with a set of timing signals, the camera including:
  a decoder coupled to the communication media for receiving a clock/data signal therefrom, the decoder separating the clock/data signal into a clock signal and a control code;
  a state-based timing generator coupled to the decoder, the timing generator providing the set of timing signals which comprise horizontal and vertical timing patterns at a rate determined by the clock signal, a particular timing pattern being selected by the control code;
  a first interface circuit coupled to the CCD which converts the uncoded video signal into first and second differential signals for transmission across the communication media;
 the system further comprising:
  an oscillator providing a reference frequency signal;
  a controller coupled to the oscillator, the controller generating the clock signal at a variable rate from the reference frequency signal, the controller including control logic which sequences through a set of instructions containing the control code;
  an encoder coupled to the controller and the communication media for combining the clock signal and the control code into the clock/data signal for transmission across the communication media to the camera;
  a second interface circuit which converts the first and second differential signals received on the communication media into a digital video signal.

13. The system of clam 12 wherein the communication media comprises a cable.

14. The system of clam 13 wherein the cable comprises a twisted pair.

15. The system of claim 12 wherein the controller, encoder and second interface circuit reside on a card which is adapted for connection to a host computer.

16. The system of claim 15 further comprising a digital processor coupled to the second interface circuit, the digital processor performing mathematical operations on the digital video signal to produce a compressed digital video signal.

17. The system of claim 16 wherein the digital processor resides on the card.

18. The system of claim 12 further comprising means for transmitting the first and second differential signals in a time-multiplexed manner across the cable.

19. The system of claim 13 wherein the second interface circuit comprises first and second differential receivers each having an output coupled to an anti-aliasing filter which has an output coupled to an input of an analog-to-digital (A/D) converter, the A/D converter producing the digital video signal at an output.

20. The system of claims 12, 13, 14, 15, 16, 17, 18 or 19 wherein the first and second differential signals comprise Luma and Chroma signals.

21. The system of claim 20 wherein the Chroma signal comprises time-multiplexed Chroma Red and Chroma Blue signals.

22. The system of claim 13 further comprising a power supply circuit coupled to the timing generator, the power supply circuit including a charge-pump circuit for generating high and low operating potentials for the camera, the charge-pump circuit being controlled by a multi-bit signal provided by the timing generator.

23. A method of communication between a video camera employing a charge-coupled device (CCD) and a remote host comprising the steps of:
 (a) transmitting an encoded control signal by the remote host to the video camera allow transfer of the first and second video signals at an arbitrary rate;
 (b) decoding the control signal received by the video camera into a set of signals which specify timing patterns and an operating frequency for the CCD;
 (c) outputting by the CCD a video signal at an arbitrary rate specified by the timing patterns and operating frequency;
 (d) transmitting the video signal to the remote host.

24. The method of claim 23 wherein the video signal comprises first and second differential signals that define a color space.

25. The method of claim 23 further comprising the steps of:
 transmitting another encoded control signal by the remote host to the video camera;
 decoding another encoded control signal received by the video camera into a new set of signals which specify new timing patterns and a different operating frequency for the CCD.

26. The method of claim 23 wherein the encoded control signal includes a variable frequency clocking signal that specifies the operating frequency for the CCD.

27. The method of claim 23 wherein step (d) comprises the steps of:
 transmitting a first differential signal containing Luma video information to the remote host;
 transmitting a second differential signal containing Chroma video information to the remote host.

28. The method of claim 27 wherein the first and second differential signals are transmitted simultaneously across a cable.

29. The method of claim 27 wherein the first and second differential signals are time-multiplexed.

30. The method of claims 23, 24, 25, 26, 27, 28, 29 wherein the remote host comprises a computer.

31. A video imaging system comprising:

a communications media;

a computer that transmits an encoded signal on the communications media;

a camera head coupled to the communications media, the camera head including timing generator circuitry that generates horizontal/vertical timing signals, a charge-coupled device (CCD) that outputs an analog video signal in accordance with the horizontal/vertical timing signals, an analog processor that produces first and second differential video signals for transmission on the communications media, the first and second differential video signals being derived from the analog video signal output by the CCD, the first and second differential signals being produced at a data rate of the timing generator circuitry, a decoder circuit that receives an encoded signal on the communications media from the host computer and decodes the encoded signal into clock and control signals, the clock and control signals respectively specifying the data rate and the horizontal/vertical timing signals for the timing generator circuitry.

32. The system of claim 31 further comprising a second camera head coupled to the communication media, the second camera head being identical to the camera head.

33. The system of claim 31 wherein the first differential video signal is a Luma signal and the second differential video signal is a Chroma signal.

34. The system of claim 33 wherein the Chroma signal comprises time-multiplexed Chroma Red ($CH_R$) and Chroma Blue ($CH_B$) signals.

35. The system of claim 31 wherein the communication media comprises a cable.

36. The system of claim 35 wherein the cable comprises a single coaxial cable.

37. The system of claim 31 wherein the communication media comprises a twisted pair.

38. The system of claim 31 wherein the communication media comprises a fiber optic cable.

39. The system of claims 31, 32, 33, 34, 35, 36, 37 or 38 further comprising a card adapted to couple the computer to the camera via the communications media.

* * * * *